ID010565578B2

United States Patent
Oulton et al.

(10) Patent No.: US 10,565,578 B2
(45) Date of Patent: *Feb. 18, 2020

(54) DEPARTMENT OF DEFENSE POINT OF SALE

(71) Applicant: American Express Travel Related Services Company, Inc., New York, NY (US)

(72) Inventors: Todd W. Oulton, Phoenix, AZ (US); Dhiraj Rattan, Gilbert, AZ (US); Neema K. Uthappa, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/815,992

(22) Filed: Nov. 17, 2017

(65) Prior Publication Data

US 2018/0082274 A1 Mar. 22, 2018

Related U.S. Application Data

(63) Continuation of application No. 14/943,746, filed on Nov. 17, 2015, now Pat. No. 9,846,869.

(51) Int. Cl.
*G06Q 20/20* (2012.01)
*G06Q 20/40* (2012.01)
*G06Q 50/26* (2012.01)

(52) U.S. Cl.
CPC ..... *G06Q 20/206* (2013.01); *G06Q 20/40145* (2013.01); *G06Q 50/265* (2013.01)

(58) Field of Classification Search
CPC .......... G06Q 20/206; G06Q 20/40145; G06Q 50/265
See application file for complete search history.

(56) References Cited

U.S. PATENT DOCUMENTS

2003/0222136 A1* 12/2003 Bolle .................... G06Q 20/06
235/379
2012/0079581 A1* 3/2012 Patterson ............ G06Q 20/206
726/7

OTHER PUBLICATIONS

USPTO; Non-Final Office Action dated Dec. 15, 2016 in U.S. Appl. No. 14/943,746.

(Continued)

*Primary Examiner* — A. Hunter Wilder
*Assistant Examiner* — Joseph M Mutschler
(74) *Attorney, Agent, or Firm* — Thomas Horstemeyer, LLP (57) ABSTRACT

A transaction account issuer may obtain receive an application for a transaction account which includes a department of defense identification code. The transaction account issuer may verify the DOD ID number with the DOD. The transaction account issuer may embed the DOD ID number in a transaction instrument which is issued to the consumer. The consumer may use the transaction instrument at a DOD point of sale located at a DOD facility. The DOD point of sale may verify with the DOD that the DOD ID number in the transaction instrument is valid. The DOD may notify the transaction account issuer that the DOD ID number is valid. The transaction account issuer may approve transactions which may have otherwise been denied.

18 Claims, 3 Drawing Sheets

(56) References Cited

OTHER PUBLICATIONS

USPTO; Final Office Action dated Jul. 7, 2017 in U.S. Appl. No. 14/943,746.
USPTO; Notice of Allowance dated Oct. 23, 2017 in U.S. Appl. No. 14/943,746.

\* cited by examiner

DEPARTMENT OF DEFENSE POINT OF SALE

CROSS REFERENCE TO RELATED APPLICATION

This application is a continuation of, claims priority to and the benefit of, U.S. Ser. No. 14/943,746 filed on Nov. 17, 2015 and entitled "SECURE GOVERNMENT TRANSACTIONS," which is hereby incorporated by reference in its entirety for all purposes.

FIELD

The present disclosure relates generally to transaction instruments, and more particularly, to security features for transaction instruments.

BACKGROUND

The United States Department of Defense issues a United States Uniformed Services Privilege and Identification Card (commonly referred to as a U.S. Military ID) to members of the Armed Forces and some members of their families. The modern U.S. military ID is called a Common Access Card ("CAC"), which contains smartcard features and may be used with specialized card readers for automatic access to certain areas. These cards (collectively referred to herein as "CAC") are used to control access to military bases, base exchanges, commissaries, and Morale Welfare and Recreation facilities. Once inside, personnel may purchase goods and services. Personnel may be required to show their CAC at the point of sale to confirm their eligibility to conduct purchases. The personnel may then initiate a transaction with a standard credit card. However, some transactions may be improperly denied as potentially fraudulent transactions, particularly for new facilities in remote areas which may not have had the opportunity to be established with a transaction account issuer.

SUMMARY

A system, method, and computer readable medium (collectively, the "system") is disclosed for secure government transactions. The method may include receiving an authorization request from a department of defense point of sale for a transaction, wherein the authorization request is associated with a transaction account and the transaction account is associated with a transaction instrument comprising a department of defense identification code; receiving a verification of the department of defense identification code from a department of defense datacenter; and transmitting an authorization response to the department of defense point of sale.

In various embodiments, the system may include determining, based on a bank identification number of the transaction instrument, that the transaction account is a department of defense transaction account. Biometric information in the authorization request may match stored biometric information. The department of defense point of sale may be at least one of a military base, base exchange, commissary, or Morale Welfare and Recreation facilities. An application may be received for the transaction account, wherein the application comprises the department of defense identification code. The department of defense identification code may be transmitted to the department of defense datacenter. In response to receiving verification of the department of defense identification code, the transaction account may be issued.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Transaction account information may be verified with a government agency in order to increase fraud protection for a transaction account. Department of Defense ("DOD") personnel may receive a DOD identification number. The DOD identification number (formerly referred to as the Electronic Data Interchange Personal Identifier (EDIPI)), is a unique 10-digit number that is associated with personnel and their Common Access Card (CAC). The DOD ID number is assigned to each person registered in the Defense Enrollment and Eligibility Reporting System (DEERS). These individuals include government civilians, active duty military, dependents, reservists, retirees and contractors. When applying for a transaction account with a transaction account issuer, a consumer may supply their DOD identification number as part of the application process. The transaction account issuer may verify the accuracy of the DOD identification number, as well as other personal information (e.g., name and birthdate) with the DOD. The transaction account issuer may then issue a DOD transaction account to the consumer. The transaction account issuer may associate the DOD identification number with the transaction account.

The consumer may use the transaction account at DOD facilities. The DOD point of sale (which may be located at the DOD facility) may verify with the DOD that the consumer is authorized to make purchases at the facility. The point of sale may transmit an authorization request to the transaction account issuer. The authorization request may include information that the transaction account was verified with the DOD. The transaction account issuer may authorize the transaction.

Figure 1:
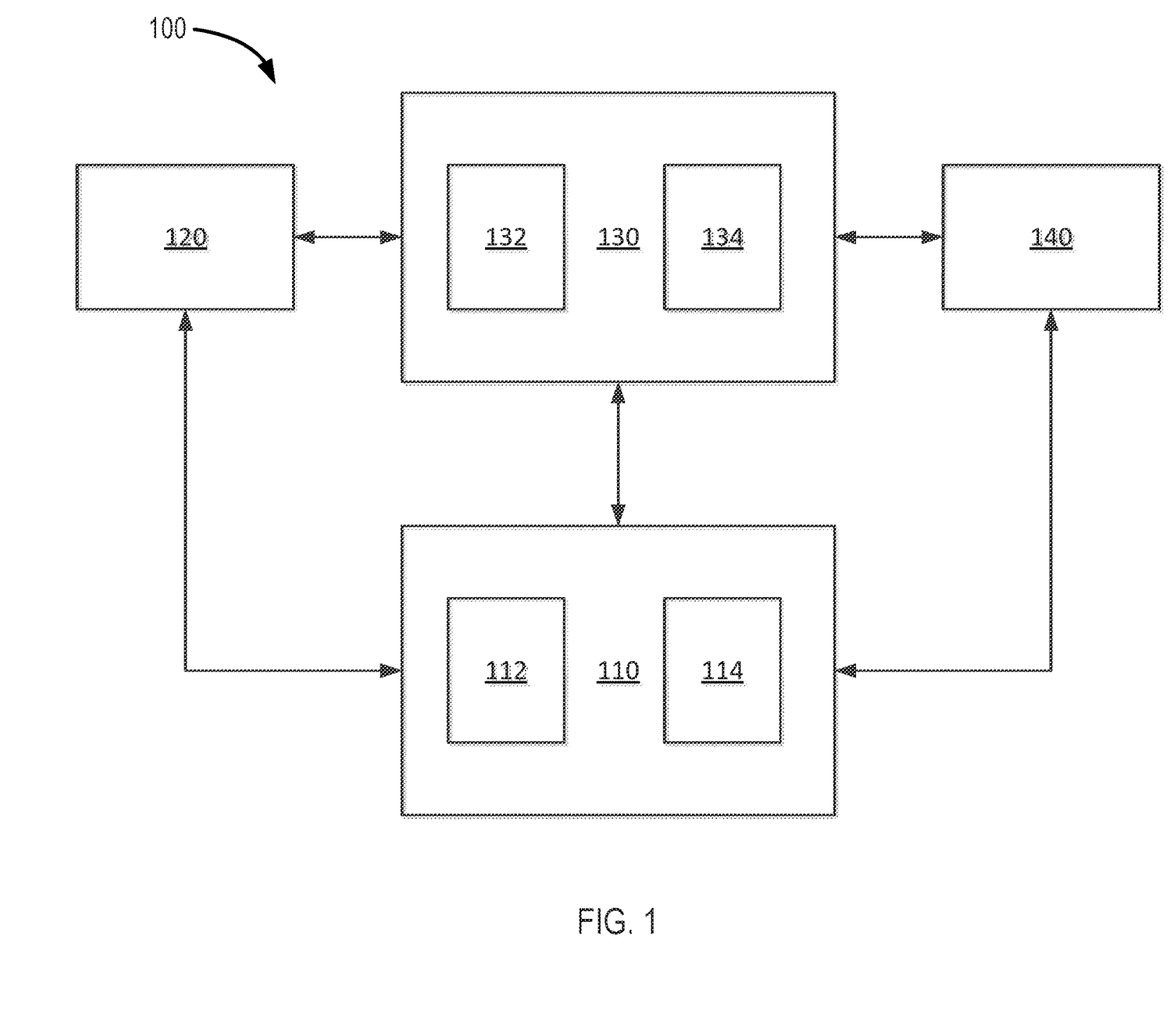
FIG. 1 illustrates an exemplary system for conducting secure transactions, in accordance with various embodiments.

Referring to FIG. 1, a system for secure government transactions is illustrated according to various embodiments. The system 100 may comprise a transaction account issuer ("TAI") 110. The TAI 110 may comprise one or more servers and databases. The TAI servers may comprise one or more computer systems in communication with the TAI databases over a network. The TAI servers may be maintained, for example, by a financial institution and/or transaction account provider. The TAI database may store data related to consumer information and to a consumer's transactions (e.g., purchase of items, etc.) using a transaction account issued by the transaction account provider. The data may comprise amounts of transactions and information about the transactions. The TAI database may further comprise demographic data about the consumer, such as income, geographic location, average spend, transaction account status, etc. The TAI 110 may comprise a customer acquisition module 112 and a card authorization system 114. Consumers may interface with the customer acquisition module 112 to create a new transaction account. The card authorization system 114 may process authorization requests for transactions.

In various embodiments, the TAI may comprise a segmented bank identification number ("BIN") range for DOD transaction accounts. The BIN (also referred to as an issuer identification number) identifies the card issuing institution that issued the card to the card holder. The BIN is often the first six digits displayed on a transaction instrument. By maintaining a segmented BIN range for DOD transaction accounts, transactions using DOD transaction accounts may be processed separately to provide increased security of DOD information, and incoming transactions may be accurately identified as coming from a DOD transaction account. Additionally, rewards programs (existing or special programs) and lending capabilities may be provided to the accounts in the segmented BIN range.

In various embodiments, the system 100 may further comprise a consumer device 120. The consumer device 120 may comprise any device capable of interacting with a network. For example, the consumer device 120 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) tablets, wearables (e.g., smart watches and smart glasses), or any other device capable of receiving data over the network. The consumer may access a website using the consumer device. The consumer may apply for a transaction account from the TAI using the consumer device. However, in various embodiments the consumer may apply for a transaction account over the phone or via mail. The consumer device 120 may comprise a biometric input sensor. For example, a consumer may hold a thumb or finger against the biometric input sensor, and the consumer device 120 may read a fingerprint. The biometric information may be used to verify the consumer's identity at the time of applying for the transaction account, as well as stored for future verification of transactions with the transaction account.

The system 100 may comprise a DOD ("Department of Defense") datacenter 130. The DOD datacenter 130 may be operated by the Department of Defense, by another government entity or by a third party. The DOD datacenter 130 may comprise one or more servers or databases. The DOD databases may store information on DOD personnel. The information may include name, DOD ID number, address, date of birth, military rank, active/reserve/discharge status, etc. As part of an application for a transaction account, the consumer may provide their DOD ID number to the TAI 110. The TAI 110 may verify information in the application to information in the DOD database to verify the accuracy and identity of the information in the application.

The DOD datacenter 130 and the TAI 110 may communicate over a dedicated T1 line 115. The dedicated T1 line 115 may provide a secure communication channel between the TAI 110 and the DOD datacenter 130. Thus, information transmitted between the DOD datacenter 130 and the TAI 110 may be protected from interception by third parties.

The system 100 may comprise a DOD facility 140. The DOD facility 140 may be a merchant which allows authorized DOD personnel to purchase goods and services. For example, the DOD facility 140 may be a military base, base exchange, commissary, or Morale Welfare and Recreation facility. The DOD facility 140 may comprise a secure entry point 142. Consumers may be required to show their CAC in order to enter the DOD facility 140. In various embodiments, the secure entry point 142 may comprise an automatic verification device, which may allow consumers to enter by swiping their CAC, or by detecting an RFID or other device in the CAC.

The DOD facility 140 may comprise a point-of-sale ("POS") terminal 144. The consumer may complete a purchase at the DOD facility 140 by using a transaction instrument at the POS terminal 144. For example, the consumer may enter (e.g., key in, swipe or insert) a transaction instrument, or may pay with a smartphone (e.g., using near field communication). The POS terminal 144 may obtain the consumer's DOD ID number from the transaction instrument. The POS terminal 144 may transmit the DOD ID number to the DOD datacenter 130 to verify that the DOD ID number is valid.

In various embodiments, the POS terminal 144 may comprise a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. The consumer may provide biometric information to the POS terminal 144 in connection with the transaction.

The POS terminal 144 may transmit an authorization request for a transaction to the TAI. The authorization request may include a field indicating that the DOD ID number was confirmed with the DOD datacenter 130.

Figure 2:
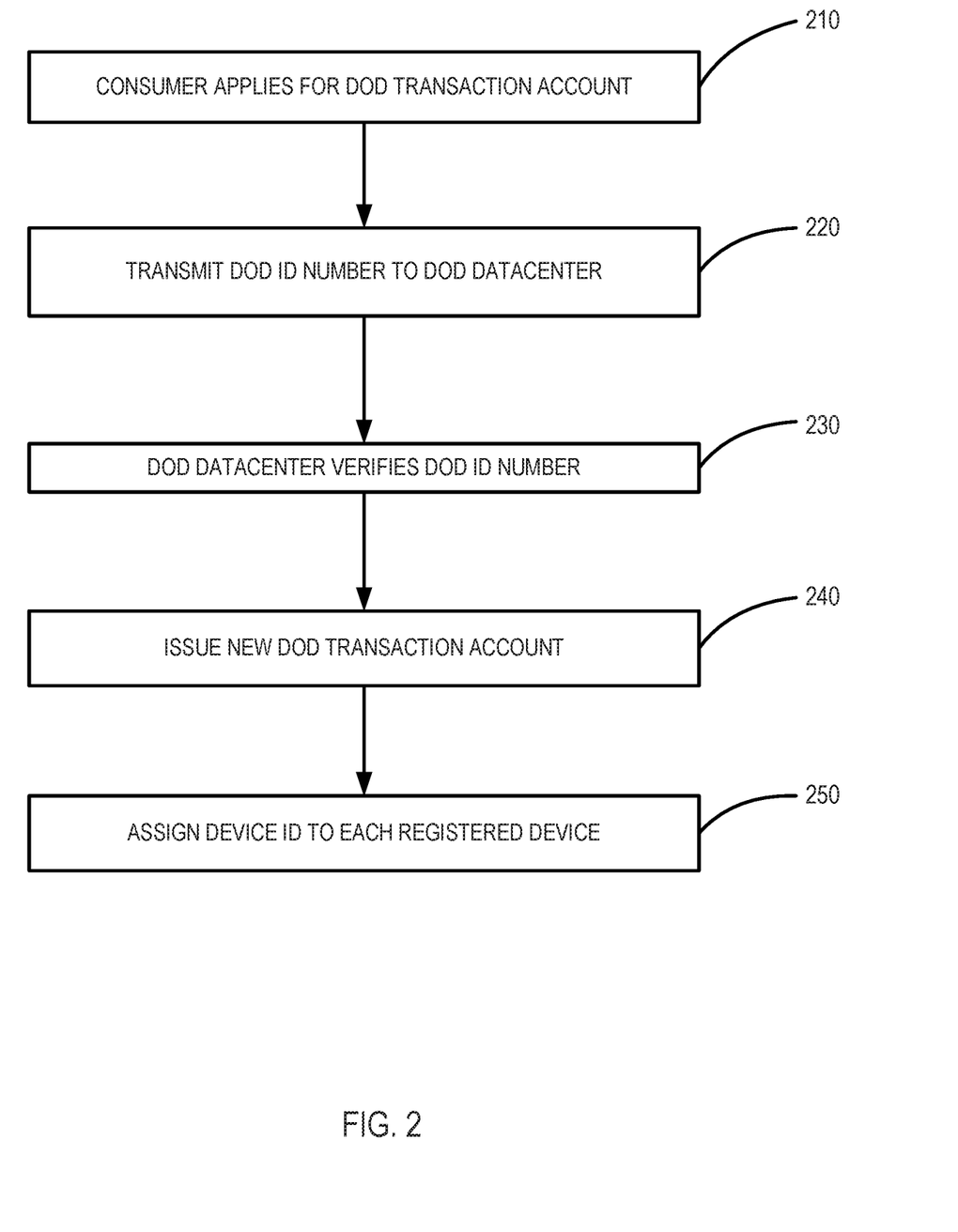
FIG. 2 illustrates a method for creating a DOD transaction account, in accordance with various embodiments.

Referring to FIG. 2, a process for issuing a transaction account is illustrated, according to various embodiments. A consumer may apply for a DOD transaction account with a transaction account issuer (step 210). The consumer may apply for the DOD transaction account via any suitable communication channel, such as over the Internet, with a smartphone app, over the phone, via direct mail, in person, etc. The consumer may provide personal information, such as name, address, salary, phone number, social security number, annual salary, photograph, biometric information, etc. The consumer may also provide a DOD ID number issued by the DOD.

The transaction account issuer may evaluate the default risk associated with the consumer. The TAI may request information from credit bureaus to assist in evaluating the default risk. Additionally, the TAI may transmit the DOD ID number to the DOD datacenter (step 220). The TAI may transmit additional information with the DOD ID number, such as name, address, etc. The DOD datacenter may verify that the DOD ID number and personal information submitted by the TAI match information in the DOD database (step 230).

In response to the DOD ID number being verified, and the default risk being within acceptable limits, the TAI may issue a new DOD transaction account to the consumer (step 240). The consumer may register multiple devices to be authorized for the DOD transaction account. For example, the consumer may register a smartphone which may conduct transactions using the DOD transaction account. The TAI may create a device ID for each device authorized to use the transaction account. The TAI may send the consumer a transaction instrument, such as a credit card. The transaction instrument may comprise the DOD ID number embedded in the transaction instrument. For example, the DOD ID number may be contained in magnetic stripe data or in a computer chip in the card. Thus, the DOD ID number may not be visible to those viewing the card.

The TAI may assign a device ID to each device associated with the transaction account (step 250). For example, the consumer may register a smartphone for the transaction account. The TAI may assign a device ID to the smartphone, and a different device ID to the transaction instrument. The TAI may assign a transaction limit to the transaction account. The transaction limit may be a maximum amount that may be charged to the transaction account for a billing cycle. In various embodiments, the transaction limit may be set by DOD limitations. The DOD limitations may be based on international treaties or agreements regarding taxes on goods and services.

Figure 3:
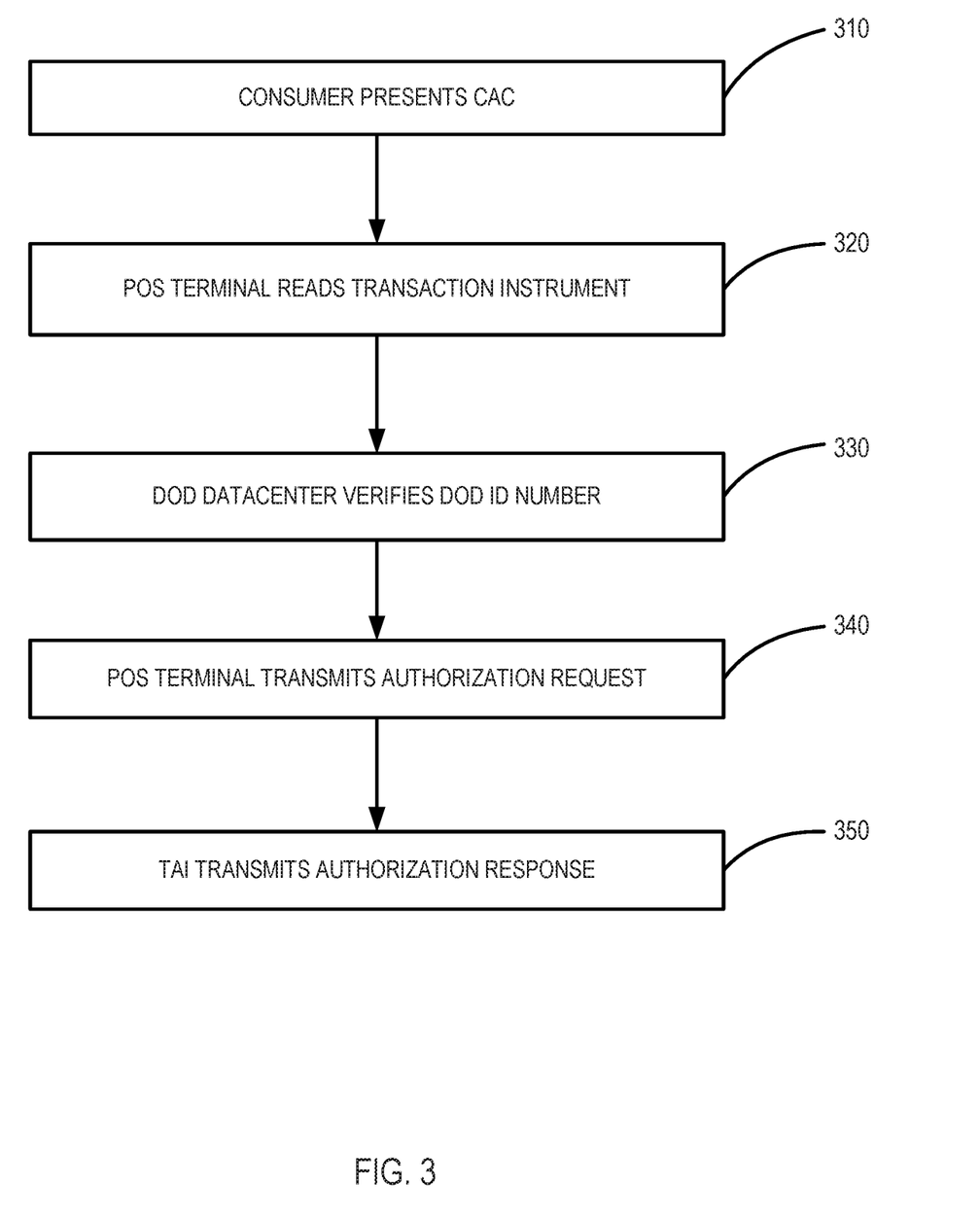
FIG. 3 illustrates a method for processing a transaction with a DOD transaction account, in accordance with various embodiments.

Referring to FIG. 3, a process for completing a transaction at a DOD facility is illustrated according to various embodiments. A consumer may present their CAC to access a DOD facility (step 310). In various embodiments, the consumer may display the CAC to a service member or employee who guards the entrance to the DOD facility. In various embodiments, a machine may read information in the CAC, and the consumer may automatically be granted access to the DOD facility, such as by a door opening or unlocking.

The consumer may select various goods or services to purchase, and the consumer may proceed to the checkout. The consumer may elect to pay with their verified transaction account. A POS terminal may read a transaction instrument of the consumer (step 320). In various embodiments, the transaction instrument may be swiped, inserted, tapped, read or interface by any other suitable method. The POS terminal may recognize the transaction instrument as being associated with a DOD transaction account. In various embodiments, the POS may detect the embedded DOD ID number in response to reading the transaction instrument. In various embodiments, the transaction instrument may have a visual indication that the transaction instrument is a DOD transaction instrument, or the consumer may notify the cashier or POS terminal that the transaction instrument is a DOD transaction instrument, and the cashier may select a button or otherwise instruct the POS terminal that the transaction will be conducted with a DOD transaction instrument. In various embodiments, the BIN will cause the transaction to be processed according to DOD transaction account procedures.

The POS terminal may transmit transaction information to the DOD datacenter. The transaction information may include information such as transaction account number, transaction amount, service establishment number, time and date of transaction, device ID, biometric information, and the DOD ID number. The DOD datacenter may verify that the DOD ID number is a valid DOD ID number (step 330). Additionally, the DOD datacenter may verify that the consumer is authorized to conduct transactions at the particular DOD facility. In various embodiments, a consumer may only be authorized to conduct transactions at a limited number of DOD facilities. For example, a consumer may only be authorized to conduct transactions in a country in which the consumer is deployed. The DOD datacenter may transmit a notification back to the DOD facility that the consumer is authorized to conduct transactions at the DOD facility. Alternatively, the DOD may transmit a notification to the POS terminal that the DOD ID number is either not valid or not authorized to conduct transactions at the DOD facility, in which case the POS terminal will discontinue the transaction. Although some POS terminals may require consumers to show their CAC at the time of the transaction, because the DOD datacenter has verified the authorization of the consumer to make purchases at the DOD facility, the consumer may forego displaying their CAC in various embodiments. In various embodiments, the DOD datacenter may transmit a preauthorization comprising the transaction information to the TAI. The preauthorization may indicate to the TAI that the DOD datacenter has verified the DOD number or other transaction information.

In response to the DOD datacenter verifying the DOD ID number and personal information, the POS terminal may transmit an authorization request to the TAI (step 340). However, in various embodiments, the POS terminal may transmit the authorization request to the DOD datacenter, and the DOD datacenter may transmit the authorization request to the TAI.

The TAI may receive the authorization request, and determine based on the BIN that the transaction is from a DOD transaction account. In various embodiments, the authorization request may comprise a field indicating that the DOD ID number was verified with the DOD datacenter. In various embodiments, the TAI may match the authorization request with a preauthorization or verification of the DOD ID number received from the DOD datacenter. The preauthorization or verification of the DOD ID number may indicate to the TAI that the transaction is less likely to be fraudulent. Thus, the TAI may authorize transactions which would have otherwise been declined without verification of the DOD ID number. In various embodiments, new remote DOD facilities, such as a new base in a war zone, may not have had the opportunity to be established with the TAI to accept transaction accounts issued by the TAI. However, by verifying with the DOD datacenter that the consumer is authorized to make transactions at the DOD facility, the TAI may be able to approve transactions. The TAI may transmit an authorization response to the POS terminal, and the POS terminal may complete the transaction (step 350). In various embodiments, the authorization response may be transmitted to the POS terminal via the DOD datacenter.

In various embodiments, the TAI server may be hosted, for example, by a transaction account issuer. Phrases and terms similar to "transaction account" may include any account that may be used to facilitate a financial transaction. Phrases and terms similar to "financial institution" or "transaction account provider" may be used interchangeably and include any entity that offers transaction account services (e.g., payment processor). Although often referred to as a "financial institution," the financial institution may represent any type of bank, lender or other type of account issuing institution, such as transaction account companies, card sponsoring companies, or third-party issuers under contract with financial institutions. It is further noted that other participants may be involved in some phases of the transaction, such as an intermediary settlement institution.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, Xbox®, Sony® PlayStation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, My Space®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory.

Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "offer" may include any good, service, information, experience, entertainment, data, item, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server.

Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

A bank may be part of the system, but the bank may represent other types of card issuing institutions, such as transaction account companies, card sponsoring companies, or third-party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method comprising:
   receiving, by a computer-based system of a transaction account issuer and from a department of defense point of sale, an authorization request for a transaction using a transaction account,
   wherein the transaction account is associated with a department of defense identification code,
   wherein the department of defense point of sale transmits the department of defense identification code to a department of defense datacenter,
   determining, by the computer-based system and based on a bank identification code associated with the transaction account, that the transaction account is a department of defense transaction account,
   processing, by the computer-based system, the transaction separately from other transactions based on the determining that the transaction account is the department of defense transaction account,
   receiving, by the computer-based system over a secure dedicated communication channel, a verification of the department of defense identification code from the department of defense datacenter;
   determining, by the computer-based system, that the verification satisfies the authorization request; and
   transmitting, by the computer-based system, an authorization response to the department of defense point of sale.

2. The method of claim 1, further comprising verifying, by the computer-based system, that biometric information in the authorization request matches stored biometric information.

3. The method of claim 1, wherein the department of defense point of sale is located at at least one of a military base, base exchange, commissary, or Morale Welfare and Recreation facilities.

4. The method of claim 1, further comprising receiving, by the computer-based system and prior to the receiving the authorization request, an application for the transaction account, wherein the application comprises the department of defense identification code.

5. The method of claim 4, further comprising transmitting, by the computer-based system, the department of defense identification code to the department of defense datacenter.

6. The method of claim 5, further comprising issuing, by the computer-based system and in response to the receiving the verification of the department of defense identification code, the department of defense transaction account.

7. The method of claim 1, wherein the transaction account is associated with a transaction instrument comprising the department of defense identification code.

8. The method of claim 1, wherein the authorization request includes a transaction account code associated with the transaction account.

9. The method of claim 1, wherein the authorization request includes the department of defense identification code.

10. The method of claim 1, wherein the department of defense datacenter verifies the department of defense identification code.

11. A system comprising:
    a processor of a transaction account issuer,
    a department of defense point of sale,
    a department of defense datacenter, a tangible, non-transitory memory configured to communicate with the processor, the department of defense point of sale, and the department of defense datacenter, the tangible, non-transitory memory having instructions stored thereon that, in response to execution by the processor, cause the system to perform operations comprising:

receiving, by the processor and from the department of defense point of sale, an authorization request for a transaction using a transaction account, wherein the transaction account is associated with a department of defense identification code, wherein the department of defense point of sale transmits the department of defense identification code to the department of defense datacenter, determining, by the processor and based on a bank identification code associated with the transaction account, that the transaction account is a department of defense transaction account, processing, by the processor, the transaction separately from other transactions based on the determining that the transaction account is the department of defense transaction account, receiving, by the processor over a secure dedicated communication channel, a verification of the department of defense identification code from the department of defense datacenter;

determining, by the processor, that the verification satisfies the authorization request; and transmitting, by the processor, an authorization response to the department of defense point of sale.

12. The system of claim 11, further having the instructions stored thereon that, in response to the execution by the processor, cause the system to perform the operations comprising verifying, by the processor, that biometric information in the authorization request matches stored biometric information.

13. The system of claim 11, wherein the department of defense point of sale is located at at least one of a military base, base exchange, commissary, or Morale Welfare and Recreation facilities.

14. The system of claim 11, further having the instructions stored thereon that, in response to the execution by the processor, cause the system to perform the operations comprising:

receiving, by the processor and prior to the receiving the authorization request, an application for the transaction account, wherein the application comprises the department of defense identification code;

transmitting, by the processor, the department of defense identification code to the department of defense datacenter; and issuing, by the processor and in response to the receiving the verification of the department of defense identification code, the department of defense transaction account.

15. The system of claim 11, wherein the transaction account is associated with a transaction instrument comprising the department of defense identification code.

16. The system of claim 11, wherein the authorization request includes a transaction account code associated with the transaction account.

17. The system of claim 11, wherein the authorization request includes the department of defense identification code.

18. The system of claim 11, wherein the department of defense datacenter verifies the department of defense identification code.

* * * * *